(12) United States Patent  
Gurgul

(10) Patent No.: US 12,205,594 B2  
(45) Date of Patent: Jan. 21, 2025

(54) VOICE-CONTROLLED SETTINGS AND NAVIGATION

(71) Applicant: Piotr Gurgul, Hergiswil (CH)

(72) Inventor: Piotr Gurgul, Hergiswil (CH)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/400,241

(22) Filed: Dec. 29, 2023

(65) Prior Publication Data

US 2024/0135926 A1    Apr. 25, 2024

Related U.S. Application Data

(63) Continuation of application No. 17/373,970, filed on Jul. 13, 2021, now Pat. No. 11,893,989.

(51) Int. Cl.
*G10L 15/22* (2006.01)
*G02B 27/01* (2006.01)

(52) U.S. Cl.
CPC ............ *G10L 15/22* (2013.01); *G02B 27/017* (2013.01); *G02B 2027/0178* (2013.01); *G10L 2015/223* (2013.01)

(58) Field of Classification Search
USPC ....................................................... 704/1–504
See application file for complete search history.

(56) References Cited

U.S. PATENT DOCUMENTS

| | | | |
|---|---|---|---|
| 10,515,625 B1 * | 12/2019 | Metallinou | G10L 15/22 |
| 10,692,495 B2 * | 6/2020 | Woo | G10L 15/22 |
| 10,733,993 B2 * | 8/2020 | Kudurshian | G06F 16/9032 |
| 11,551,662 B2 * | 1/2023 | Yun | G10L 15/16 |
| 11,571,814 B2 * | 2/2023 | Johnson | B25J 9/1682 |
| 11,597,084 B2 * | 3/2023 | Johnson | B25J 9/1664 |
| 11,597,085 B2 * | 3/2023 | Johnson | B25J 9/1674 |
| 11,597,086 B2 * | 3/2023 | Johnson | B25J 9/1664 |
| 11,597,087 B2 * | 3/2023 | Johnson | B25J 9/1664 |

(Continued)

FOREIGN PATENT DOCUMENTS

WO    WO-2023287649 A1 *    1/2023    ........... G02B 27/017

OTHER PUBLICATIONS

International Search Report and Written Opinion received in Patent Cooperation Treaty Application No. PCT/US2022/036463, dated Nov. 10, 2022, 9 pages.

*Primary Examiner* — Marcus T Riley
(74) *Attorney, Agent, or Firm* — CM Law; Stephen J. Weed

(57) ABSTRACT

A system and method for controlling an electronic eyewear device using voice commands receives audio data from a microphone, processes the audio data to identify a wake word, and upon identification of a wake word, processes the audio data to identify at least one action keyword in the audio data. The audio data is provided to one of a plurality of controllers associated with different action keywords or sets of action keywords to implement an action. For example, the audio data may be provided to a settings controller to adjust settings of the electronic eyewear device when the action keyword is indicative of a request to adjust a setting of the electronic eyewear device or to a navigation controller to navigate to the system information of the electronic eyewear device when the action keyword is indicative of a request to navigate to system information of the electronic eyewear device.

20 Claims, 17 Drawing Sheets

(56) References Cited

U.S. PATENT DOCUMENTS

| | | | | |
|---|---|---|---|---|
| 11,607,810 | B2* | 3/2023 | Johnson | A47J 44/00 |
| 11,628,566 | B2* | 4/2023 | Johnson | B25J 9/1674 |
| | | | | 700/245 |
| 11,631,406 | B2* | 4/2023 | Kim | G10L 15/08 |
| | | | | 704/251 |
| 11,648,669 | B2* | 5/2023 | Johnson | A47J 44/00 |
| | | | | 700/216 |
| 11,651,773 | B2* | 5/2023 | Jones | H04N 21/47217 |
| | | | | 704/257 |
| 11,708,031 | B2* | 7/2023 | Yang | A47G 1/04 |
| | | | | 359/838 |
| 11,823,360 | B2* | 11/2023 | Rodriguez | G06F 1/3243 |
| 11,893,989 | B2* | 2/2024 | Gurgul | G02B 27/017 |
| 11,949,969 | B1* | 4/2024 | Moll | G06K 19/06037 |
| 2016/0210602 | A1* | 7/2016 | Siddique | G06Q 20/047 |
| 2018/0286402 | A1* | 10/2018 | LeBeau | G10L 15/22 |
| 2019/0066680 | A1* | 2/2019 | Woo | G10L 15/22 |
| 2020/0051554 | A1* | 2/2020 | Kim | G06F 3/167 |
| 2021/0035552 | A1* | 2/2021 | Grizzel | G06F 3/0346 |
| 2021/0334645 | A1* | 10/2021 | Pardeshi | G10L 15/16 |
| 2022/0312332 | A1* | 9/2022 | Gurgul | G01S 5/0252 |
| 2023/0021286 | A1* | 1/2023 | Gurgul | G02B 27/017 |
| 2023/0068730 | A1* | 3/2023 | Jun | G06T 19/006 |
| 2023/0215107 | A1* | 7/2023 | Gurgul | H04W 52/0209 |
| | | | | 345/633 |
| 2024/0037346 | A1* | 2/2024 | Chorakhalikar | H04L 67/125 |
| 2024/0069843 | A1* | 2/2024 | Gurgul | H04W 76/14 |
| 2024/0070996 | A1* | 2/2024 | Gurgul | G06T 19/006 |
| 2024/0078147 | A1* | 3/2024 | Gurgul | G06F 3/011 |
| 2024/0094822 | A1* | 3/2024 | Moll | G06F 3/0304 |
| 2024/0096031 | A1* | 3/2024 | Gurgul | G06F 3/011 |
| 2024/0134724 | A1* | 4/2024 | Gajulapally | H04L 67/133 |
| 2024/0135926 | A1* | 4/2024 | Gurgul | G10L 15/22 |
| 2024/0139611 | A1* | 5/2024 | Moll | G06F 3/017 |
| 2024/0144673 | A1* | 5/2024 | Moll | G06V 10/764 |
| 2024/0193982 | A1* | 6/2024 | Gurgul | G02B 27/017 |
| 2024/0244285 | A1* | 7/2024 | Gurgul | G06F 3/013 |

* cited by examiner

VOICE-CONTROLLED SETTINGS AND NAVIGATION

CROSS-REFERENCE TO RELATED APPLICATIONS

This application claims priority to U.S. application Ser. No. 17/373,970 filed on Jul. 13, 2021, the contents of which are incorporated fully herein by reference.

TECHNICAL FIELD

Examples set forth in the present disclosure relate to a voice interface for portable electronic devices, including wearable electronic devices such as augmented reality (a.k.a., smart) glasses. More particularly, but not by way of limitation, the present disclosure describes techniques for adjusting settings and navigating in response to voice inputs to an electronic eyewear device.

BACKGROUND

Wearable electronic devices such as electronic eyewear devices may communicate with application programs running on mobile devices such as a user's smartphone and, in some cases, may communicate directly with a server. In either case, the electronic eyewear device may support direct device integration with communication application backend services as well as third-party application programming interfaces (APIs) such as text-to-speech, the SHAZAM PLAYER® app, and the like. The wearer of the electronic eyewear devices may select display features through interaction with the electronic eyewear device. The limited interfaces to the electronic eyewear device make selection of display features and settings difficult.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 10A illustrates the user interface before an application has been selected; FIG. 10B illustrates the user interface when the user has asked to see the volume level; FIG. 10C illustrates the user interface when the user has asked to increase the volume by 10%; and FIG. 10D illustrates the user interface when the user has asked to see the brightness level.

DETAILED DESCRIPTION

Figure 1A:
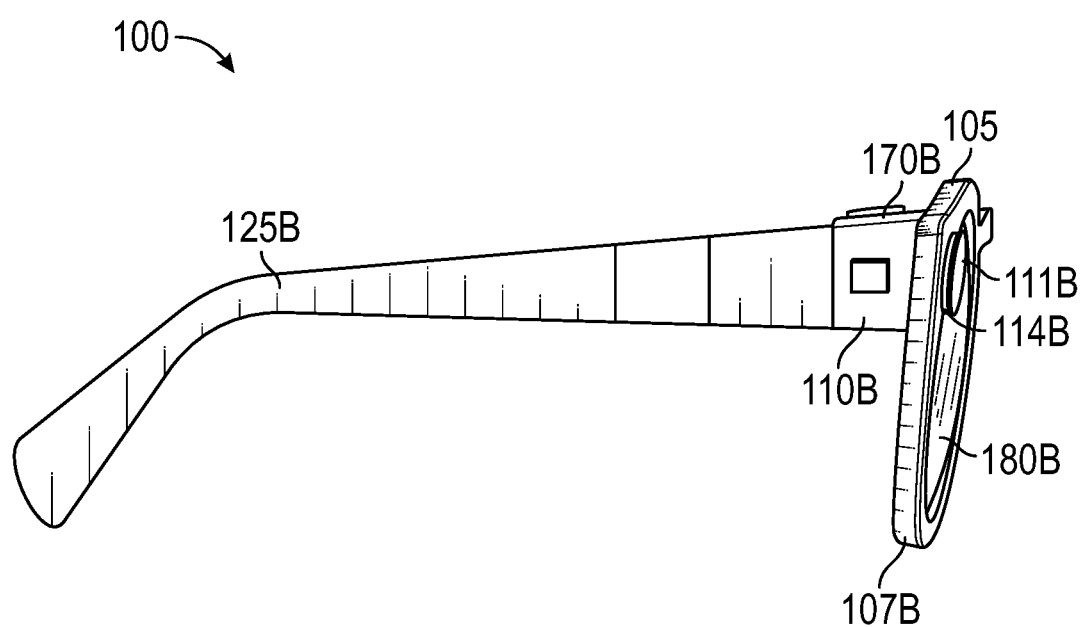
FIG. 1A illustrates a side view of an example hardware configuration of an electronic eyewear device showing a right optical assembly with an image display.

When using a portable electronic device such as augmented reality (a.k.a., smart) glasses, conventional devices often make it difficult to read and change settings (e.g., brightness, volume, WI-FI® connectivity, battery level, thermal status, etc.) and to navigate to the system information or applications. For viewing most settings, the user is required to navigate to system information, which is not very convenient for a quick battery or temperature level check. Changing settings may require access to a paired device even in the case of simple brightness adjustments. It is desired to provide systems and methods for reading and changing settings and to navigate to the system information using simple voice commands without requiring access to a paired device.

The systems and methods described herein expand the use of a wake word voice command such as "Hey Snapchat . . . " beyond voice scanning to provide infrastructure for general purpose voice commands (not just for settings). To facilitate settings adjustments, commands such as the following may be recognized: "volume/brightness up [+10]," "volume/brightness down [−10]," "set brightness/volume to n %," "provide brightness setting," "provide battery level," "provide temperature," etc. However, the range can be extended to support virtually any well-defined voice command. The response to the command may be communicated as a notification/alert using, for example, an intent-based infrastructure.

In a sample configuration, the user may propose augmented reality (AR) device settings adjustments and preview the adjustments on-the-go, in any context, without the need to access a paired device. The systems and methods described herein support almost arbitrary voice and navigation commands like "set brightness to 10%," "what's my battery level," or "go to gallery." Such a voice controlled interface is especially important for personal electronic devices such as AR glasses as there typically is no touch input or keyboard. The alternative is to go to the paired companion app on an associated smartphone to adjust the settings. Such an approach is very inconvenient. The voice interface described herein renders such navigation for settings adjustment unnecessary.

This disclosure is thus directed to a system, a method, and computer-readable medium including instructions for controlling an electronic eyewear device using voice commands. The system and method are adapted to receive audio data from a microphone, process the audio data to identify a wake word, and process the audio data to identify at least one action keyword in the audio data. Upon identification of the wake word, the audio data is provided to one of a plurality of controllers associated with different action keywords or sets of action keywords to implement an action. For example, the audio data may be provided to a settings controller to adjust settings of the electronic eyewear device when the action keyword is indicative of a request to adjust a setting of the electronic eyewear device or to a navigation controller to navigate to the system information of the electronic eyewear device when the action keyword is indicative of a request to navigate to system information of the electronic eyewear device. When the audio data does not contain an action keyword indicative of a request to adjust a setting of the electronic eyewear device or of a request to navigate to system information of the electronic eyewear device, the audio data may be provided to a scan controller. At least one of results of an action requested by the action keyword or set of action keywords or a notification indicating an action taken in response to the audio data received at the microphone may be provided to the display without disrupting a current action being presented to the display as part of execution of a software application.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample electronic eyewear device with a voice interface will be described with respect to FIGS. 1-11.

Figure 2A:
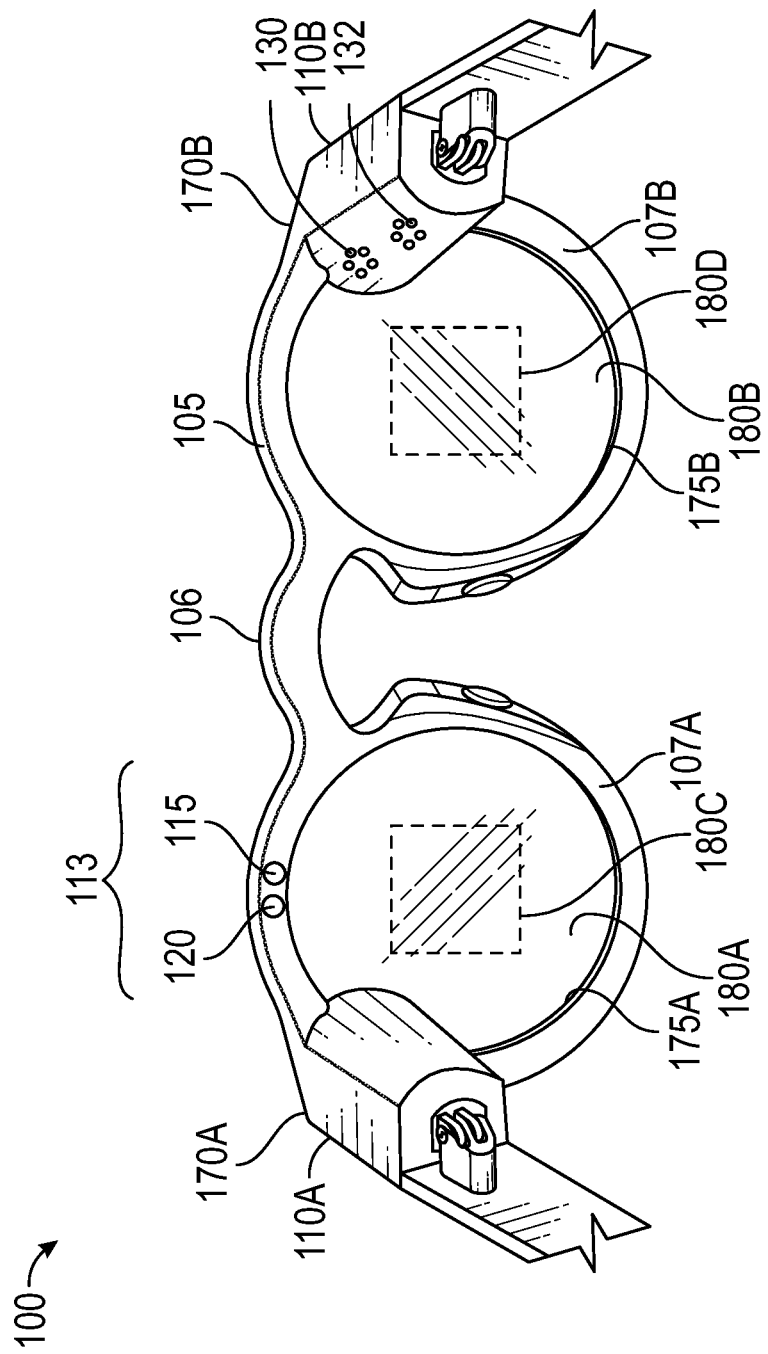
FIG. 2A illustrates a rear view of an example hardware configuration of an electronic eyewear device in an example hardware configuration.

FIG. 1A illustrates a side view of an example hardware configuration of an electronic eyewear device 100 including a right optical assembly 180B with an image display 180D (FIG. 2A). Electronic eyewear device 100 includes multiple visible light cameras 114A-B (FIG. 5) that form a stereo camera, of which the right visible light camera 114B is located on a right temple 110B and the left visible light camera 114A is located on a left temple 110A.

The left and right visible light cameras 114A-B may include an image sensor that is sensitive to the visible light range wavelength. Each of the visible light cameras 114A-B has a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B may be captured along with geolocation data, digitized by an image processor, and stored in a memory.

To provide stereoscopic vision, visible light cameras 114A-B may be coupled to an image processor (element 612 of FIG. 6) for digital processing along with a timestamp in which the image of the scene is captured. Image processor 612 may include circuitry to receive signals from the visible light camera 114A-B and to process those signals from the visible light cameras 114A-B into a format suitable for storage in the memory (element 634 of FIG. 6). The timestamp may be added by the image processor 612 or other processor that controls operation of the visible light cameras 114A-B. Visible light cameras 114A-B allow the stereo camera to simulate human binocular vision. Stereo cameras also provide the ability to reproduce three-dimensional images (image 515 of FIG. 5) based on two captured images (elements 558A-B of FIG. 5) from the visible light cameras 114A-B, respectively, having the same timestamp. Such three-dimensional images 515 allow for an immersive lifelike experience, e.g., for virtual reality or video gaming. For stereoscopic vision, the pair of images 558A-B may be generated at a given moment in time—one image for each of the left and right visible light cameras 114A-B. When the pair of generated images 558A-B from the frontward facing field of view (FOV) 111A-B of the left and right visible light cameras 114A-B are stitched together (e.g., by the image processor 612), depth perception is provided by the optical assembly 180A-B.

In an example, the electronic eyewear device 100 includes a frame 105, a right rim 107B, a right temple 110B extending from a right lateral side 170B of the frame 105, and a see-through image display 180D (FIGS. 2A-B) comprising optical assembly 180B to present a graphical user interface to a user. The electronic eyewear device 100 includes the left visible light camera 114A connected to the frame 105 or the left temple 110A to capture a first image of the scene. Electronic eyewear device 100 further includes the right visible light camera 114B connected to the frame 105 or the right temple 110B to capture (e.g., simultaneously with the left visible light camera 114A) a second image of the scene which partially overlaps the first image. Although not shown in FIGS. 1A-B, a processor 632 (FIG. 6) is coupled to the electronic eyewear device 100 and connected to the visible light cameras 114A-B and memory 634 (FIG. 6) accessible to the processor 632, and programming in the memory 634 may be provided in the electronic eyewear device 100 itself.

Figure 1B:
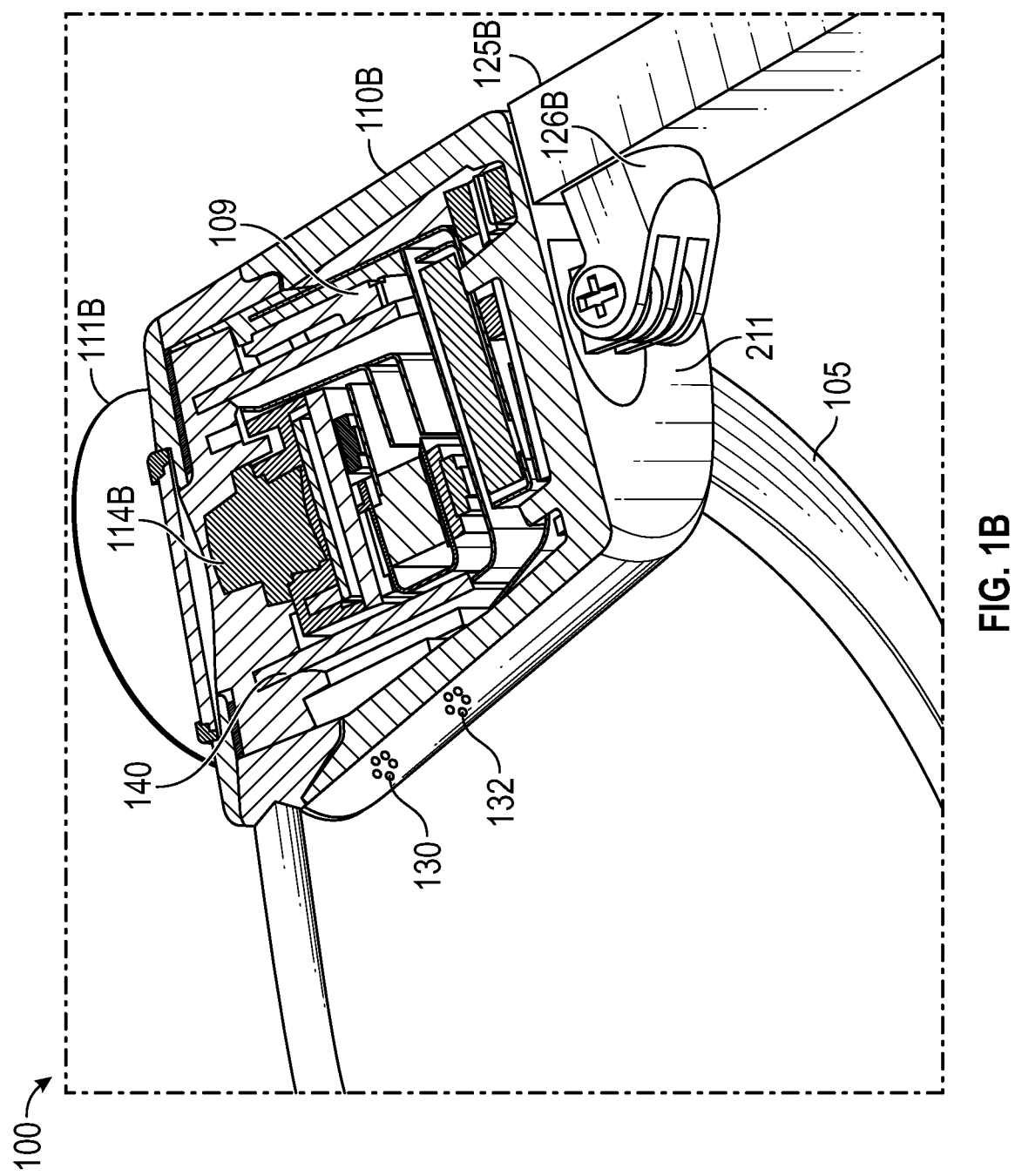
FIG. 1B illustrates a top cross-sectional view of a temple of the electronic eyewear device of FIG. 1A.
Figure 2B:
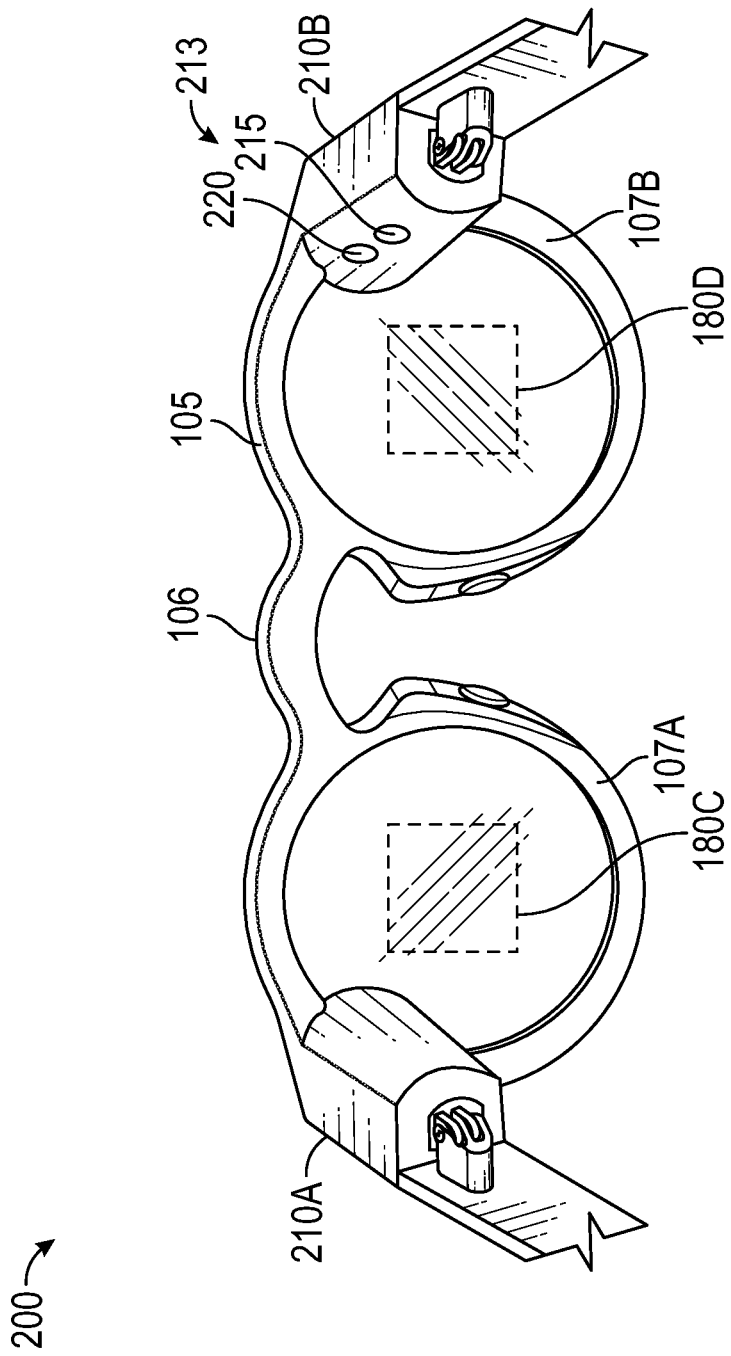
FIG. 2B illustrates a rear view of an example hardware configuration of another electronic eyewear device in an example hardware configuration.
Figure 2C:
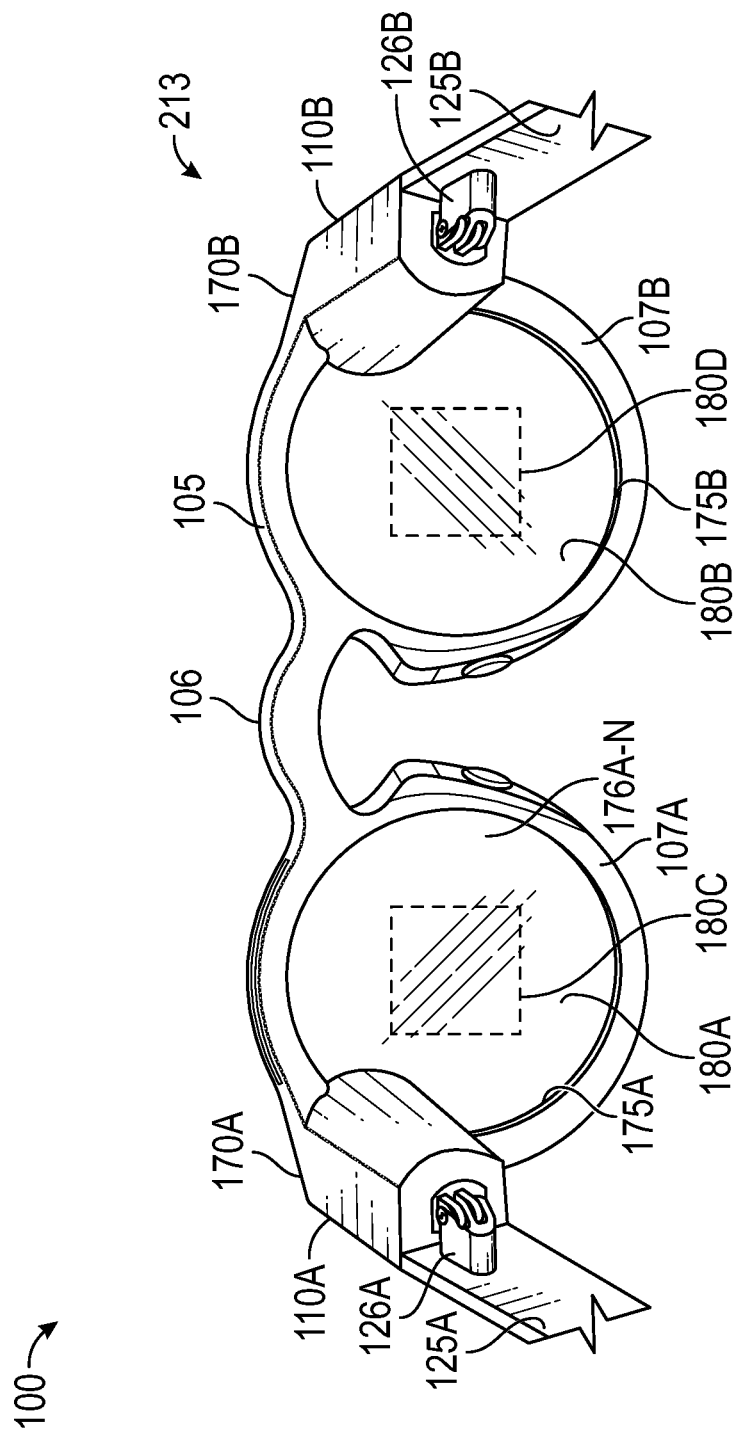
FIG. 2C and FIG. 2D illustrate rear views of example hardware configurations of an electronic eyewear device including two different types of image displays.

Although not shown in FIG. 1A, the electronic eyewear device 100 also may include a head movement tracker (element 109 of FIG. 1B) or an eye movement tracker (element 113 of FIG. 2A or element 213 of FIGS. 2B-C). Electronic eyewear device 100 may further include the see-through image displays 180C-D of optical assembly 180A-B, respectfully, for presenting a sequence of displayed images, and an image display driver (element 642 of FIG. 6) coupled to the see-through image displays 180C-D of optical assembly 180A-B to control the image displays 180C-D of optical assembly 180A-B to present the sequence of displayed images 515, which are described in further detail below. Electronic eyewear device 100 may further include the memory 634 and the processor 632 having access to the image display driver 642 and the memory 634, as well as programming in the memory 634. Execution of the programming by the processor 632 configures the electronic eyewear device 100 to perform functions, including functions to present, via the see-through image displays 180C-D, an initial displayed image of the sequence of displayed images, the initial displayed image having an initial field of view corresponding to an initial head direction or an initial eye gaze direction.

Execution of the programming by the processor 632 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B-C), an eye movement of an eye of the user of the electronic eyewear device 100. Execution of the programming by the processor 632 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 632 may further configure the electronic eyewear device 100 to generate a successive displayed image of the sequence of displayed images based on the field of view adjustment. Execution of the programming by the processor 632 may further configure the electronic eyewear device 100 to present, via the see-through image displays 180C-D of the optical assembly 180A-B, the successive displayed images.

FIG. 1B illustrates a top cross-sectional view of the temple of the electronic eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A (FIG. 2A). As shown, the electronic eyewear device 100 includes the right visible light camera 114B and a circuit board, which may be a flexible printed circuit board (PCB) 140. The right hinge 126B connects the right temple 110B to hinged arm 125B of the electronic eyewear device 100. In some examples, components of the right visible light camera 114B, the flexible PCB 140, or other electrical connectors or contacts may be located on the right temple 110B or the right hinge 126B.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via an inertial measurement unit of the head movement tracker 109, a successive head direction on the horizontal axis, the vertical axis, or the combination thereof during presentation of the initial displayed image.

Tracking, via the head movement tracker 109, the head movement of the head of the user may further include determining the variation of head direction based on both the initial head direction and the successive head direction. Detecting movement of the user of the electronic eyewear device 100 may further include in response to tracking, via the head movement tracker 109, the head movement of the head of the user, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110B includes temple body 211 and a temple cap, with the temple cap omitted in the cross-section of FIG. 1B. Disposed inside the right temple 110B are various interconnected circuit boards, such as PCBs or flexible PCBs 140, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B is coupled to or disposed on the flexible PCB 140 and covered by a visible light camera cover lens, which is aimed through opening(s) formed in the right temple 110B. In some examples, the frame 105 connected to the right temple 110B includes the opening(s) for the visible light camera cover lens. The frame 105 may include a front-facing side configured to face outwards away from the eye of the user. The opening for the visible light camera cover lens may be formed on and through the front-facing side. In the example, the right visible light camera 114B has an outward facing angle of coverage 111B with a line of sight or perspective of the right eye of the user of the electronic eyewear device 100. The visible light camera cover lens also can be adhered to an outward facing surface of the right temple 110B in which an opening is formed with an outwards facing angle of coverage, but in a different outwards direction. The coupling can also be indirect via intervening components.

Left (first) visible light camera 114A may be connected to the left see-through image display 180C of left optical assembly 180A to generate a first background scene of a first successive displayed image. The right (second) visible light camera 114B may be connected to the right see-through image display 180D of right optical assembly 180B to generate a second background scene of a second successive displayed image. The first background scene and the second background scene may partially overlap to present a three-dimensional observable area of the successive displayed image.

Flexible PCB 140 may be disposed inside the right temple 110B and coupled to one or more other components housed in the right temple 110B. Although shown as being formed on the circuit boards 140 of the right temple 110B, the right visible light camera 114B can be formed on the circuit boards 140 of the left temple 110A, the hinged arms 125A-B, or frame 105.

FIG. 2A illustrates a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the left rim 107A connected to the right rim 107B via the bridge 106 adapted for a nose of the user. The left and right rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the electronic eyewear device 100 can include other arrangements, such as a single optical element depending on the application or intended user of the electronic eyewear device 100. As further shown, electronic eyewear device 100 includes the left temple 110A adjacent the left lateral side 170A of the frame 105 and the right temple 110B adjacent the right lateral side 170B of the frame 105. The temples 110A-B may be integrated into the frame 105 on the respective sides 170A-B (as illustrated) or implemented as separate components attached to the frame 105 on the respective sides 170A-B. Alternatively, the temples 110A-B may be integrated into hinged arms 125A-B attached to the frame 105.

In the example of FIG. 2A, an eye scanner 113 may be provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107A. The frame 105 or one or more of the left and right temples 110A-B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107B, or in different locations on the frame 105. For example, the infrared emitter 115 may be on the left rim 107A and the infrared camera 120 may be on the right rim 107B. In another example, the infrared emitter 115 may be on the frame 105 and the infrared camera 120 may be on one of the temples 110A-B, or vice versa. The infrared emitter 115 can be connected essentially anywhere on the frame 105, left temple 110A, or right temple 110B to emit a pattern of infrared light. Similarly, the infrared camera 120 can be connected essentially anywhere on the frame 105, left temple 110A, or right temple 110B to capture at least one reflection variation in the emitted pattern of infrared light.

The infrared emitter 115 and infrared camera 120 may be arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temples 110A-B at either ends of the frame 105.

FIG. 2B illustrates a rear view of an example hardware configuration of another electronic eyewear device 200. In this example configuration, the electronic eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a left rim 107A which is connected to a right rim 107B via a bridge 106. The left and right rims 107A-B may include respective apertures which hold the respective optical elements 180A-B comprising the see-through display 180C-D.

Figure 2D:
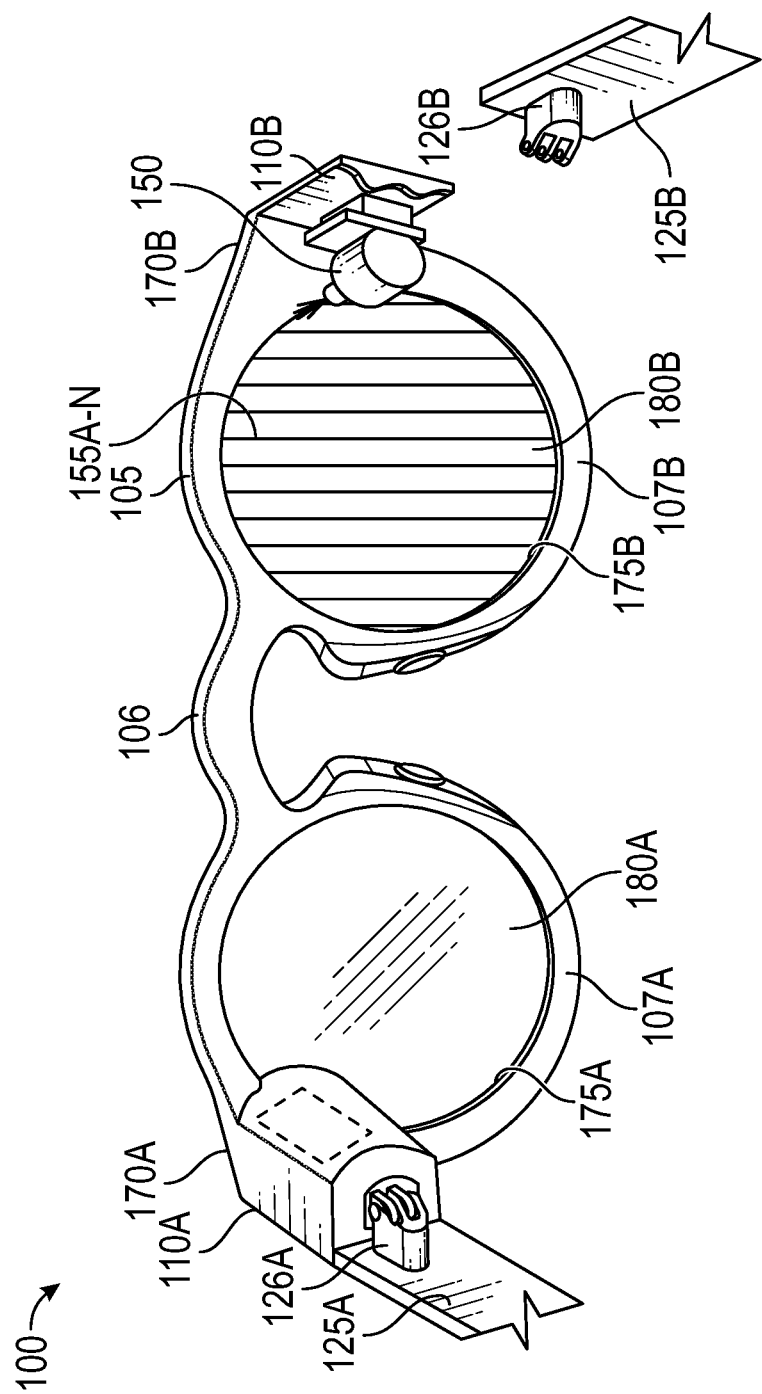

FIGS. 2C-D illustrate rear views of example hardware configurations of the electronic eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display.

The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N may extend over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B may include a projection image display as shown in FIG. 2D. The optical assembly 180A-B includes a projector 150, which may be a three-color projector using a scanning mirror, a galvanometer, a laser projector, or other types of projectors. During operation, an optical source such as a projector 150 is disposed in or on one of the temples 110A-B of the electronic eyewear device 100. Optical assembly 180-B may include one or more optical strips 155A-N spaced apart across the width of the lens of the optical assembly 180A-B or across a depth of the lens between the front surface and the rear surface of the lens.

As the photons projected by the projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls optical strips 155A-N by initiating mechanical, acoustic, or electromagnetic signals. Although shown as having two optical assemblies 180A-B, the electronic eyewear device 100 can include other arrangements, such as a single or three optical assemblies, or the optical assembly 180A-B may have arranged different arrangement depending on the application or intended user of the electronic eyewear device 100.

As further shown in FIGS. 2C-D, electronic eyewear device 100 includes a left temple 110A adjacent the left lateral side 170A of the frame 105 and a right temple 110B adjacent the right lateral side 170B of the frame 105. The temples 110A-B may be integrated into the frame 105 on the respective lateral sides 170A-B (as illustrated) or implemented as separate components attached to the frame 105 on the respective sides 170A-B. Alternatively, the temples 110A-B may be integrated into the hinged arms 125A-B attached to the frame 105.

In one example, the see-through image displays include the first see-through image display 180C and the second see-through image display 180D. Electronic eyewear device 100 may include first and second apertures 175A-B that hold the respective first and second optical assembly 180A-B. The first optical assembly 180A may include the first see-through image display 180C (e.g., a display matrix of FIG. 2C or optical strips 155A-N' and a projector 150A (not shown) in left temple 110A). The second optical assembly 180B may include the second see-through image display 180D (e.g., a display matrix of FIG. 2C or optical strips 155A-N" and a projector 150B (not shown) in right temple 110B). The successive field of view of the successive displayed image may include an angle of view between about 15° to 30°, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
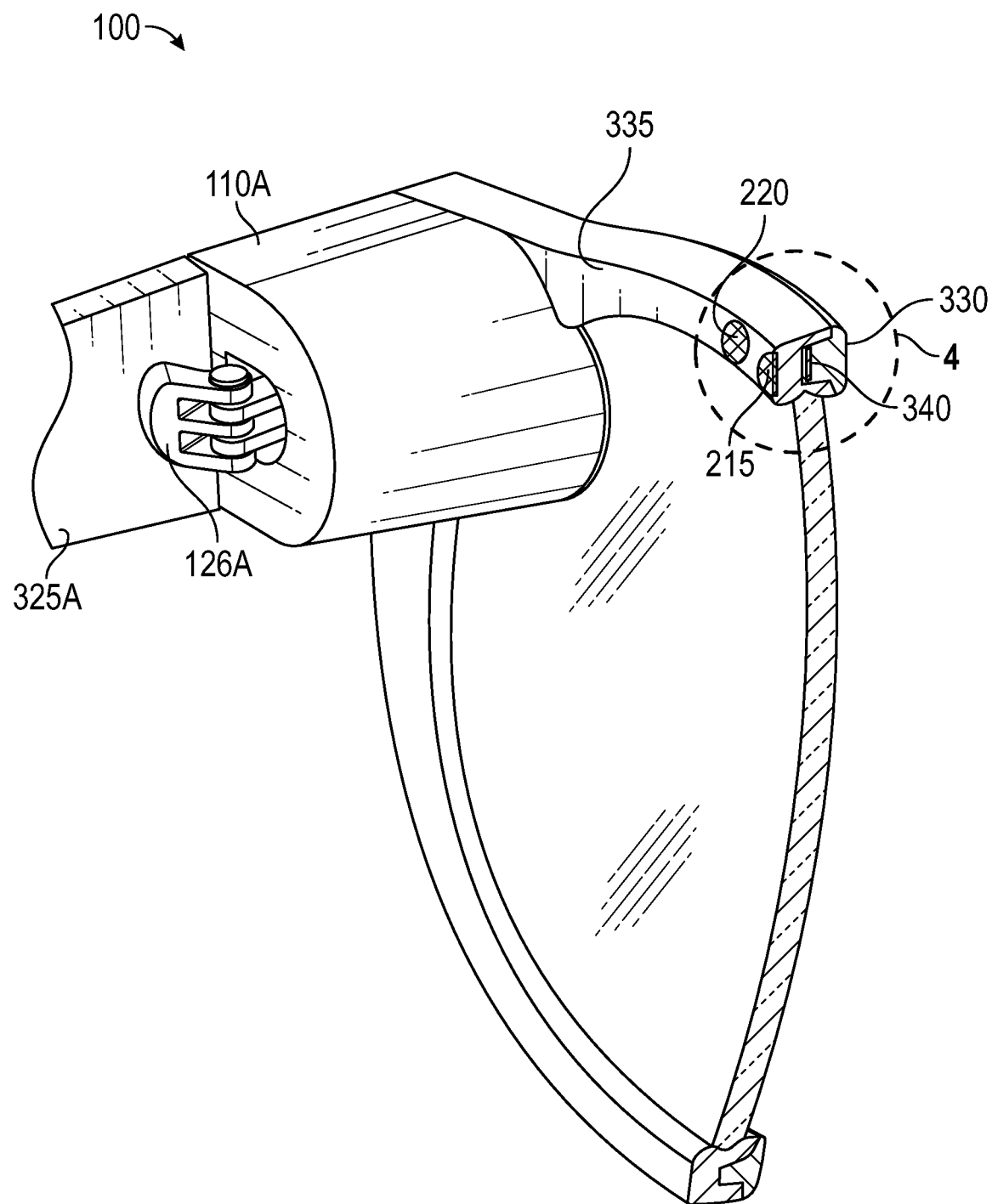
FIG. 3 illustrates a rear perspective view of the electronic eyewear device of FIG. 2A depicting an infrared emitter, an infrared camera, a frame front, a frame back, and a circuit board.

FIG. 3 illustrates a rear perspective view of the electronic eyewear device 100 of FIG. 2A. The electronic eyewear device 100 includes an infrared emitter 215, infrared camera 220, a frame front 330, a frame back 335, and a circuit board 340. It can be seen in FIG. 3 that the upper portion of the left rim of the frame of the electronic eyewear device 100 may include the frame front 330 and the frame back 335. An opening for the infrared emitter 215 is formed on the frame back 335.

As shown in the encircled cross-section 4 in the upper middle portion of the left rim of the frame, a circuit board, which may be a flexible PCB 340, is sandwiched between the frame front 330 and the frame back 335. Also shown in further detail is the attachment of the left temple 110A to the left hinged arm 325A via the left hinge 126A. In some examples, components of the eye movement tracker 213, including the infrared emitter 215, the flexible PCB 340, or other electrical connectors or contacts may be located on the left hinged arm 325A or the left hinge 126A.

Figure 4:
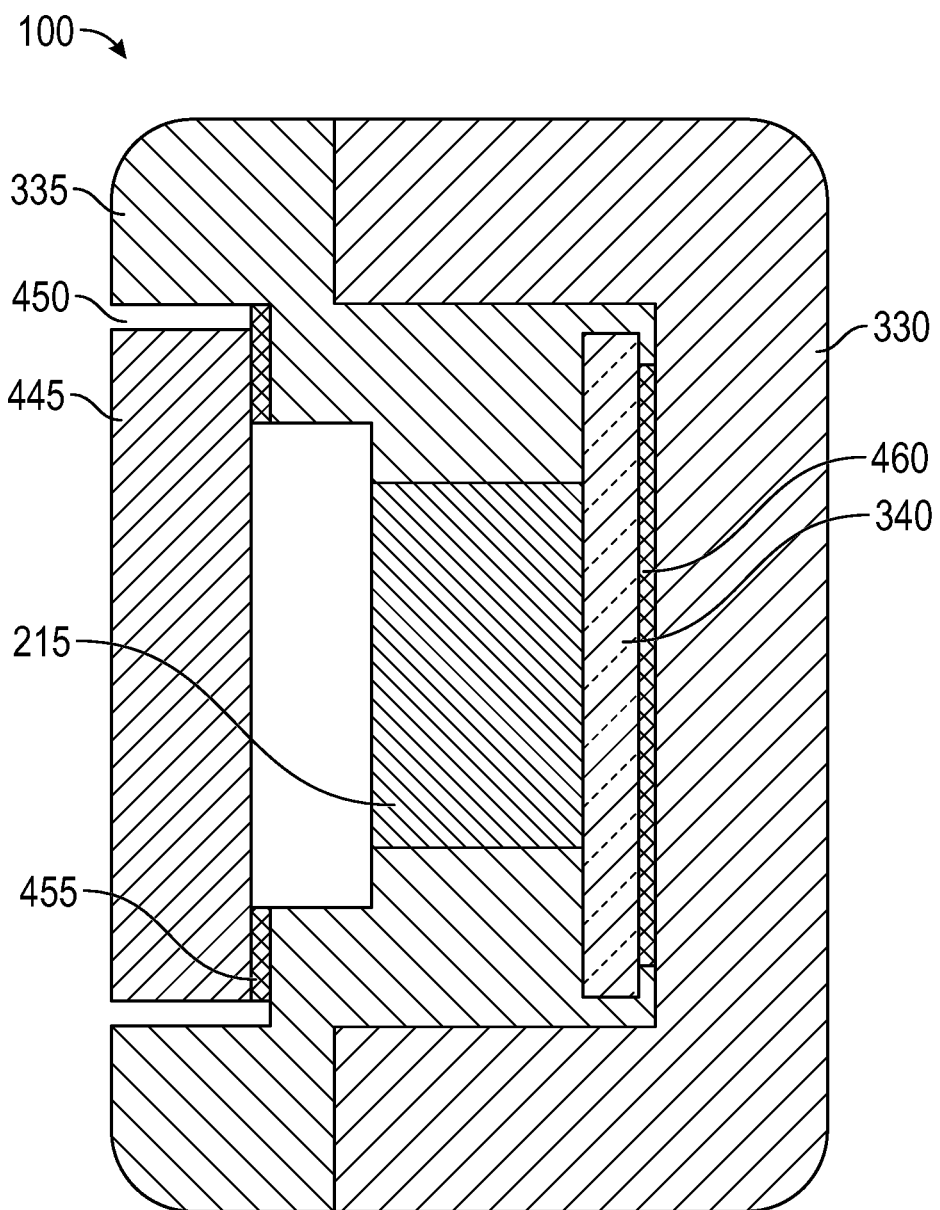
FIG. 4 illustrates a cross-sectional view taken through the infrared emitter and the frame of the electronic eyewear device of FIG. 3.

FIG. 4 is a cross-sectional view through the infrared emitter 215 and the frame corresponding to the encircled cross-section 4 of the electronic eyewear device 100 of FIG. 3. Multiple layers of the electronic eyewear device 100 are illustrated in the cross-section of FIG. 4. As shown, the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 may be reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 may include an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling also can be indirect via intervening components.

Figure 5:
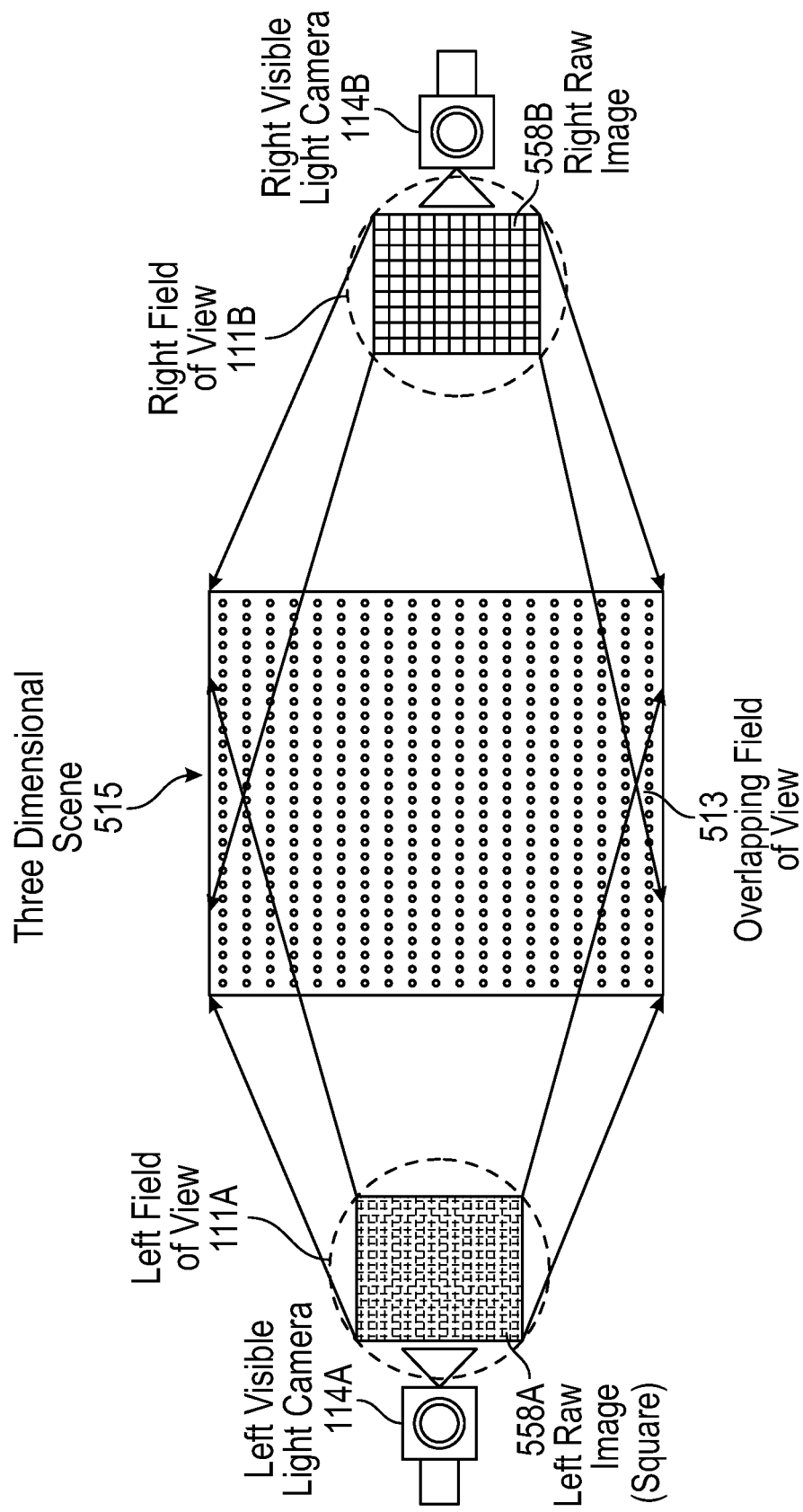
FIG. 5 illustrates an example of visible light captured by the left visible light camera as a left raw image and visible light captured by the right visible light camera as a right raw image.
Figure 6:
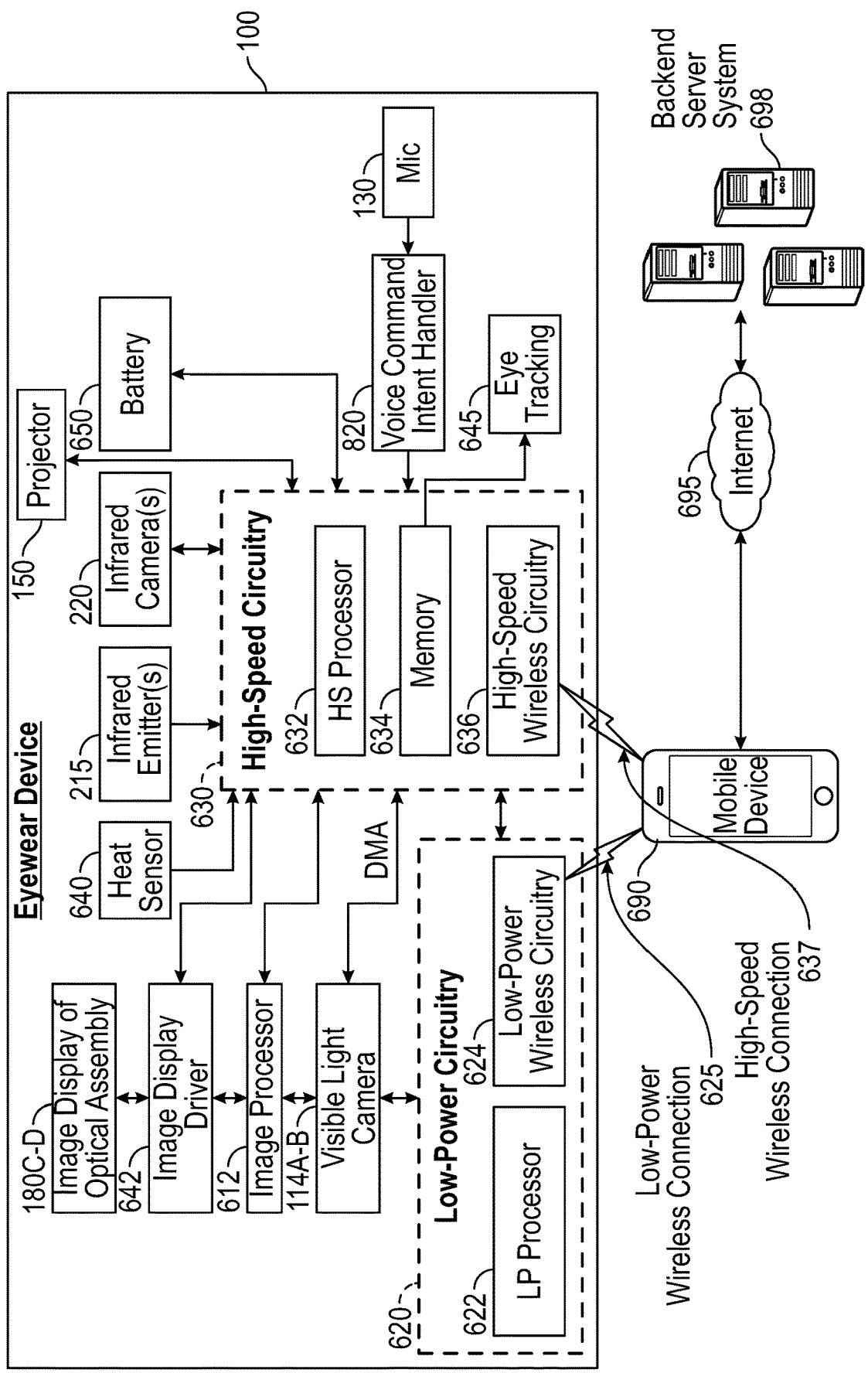
FIG. 6 illustrates a block diagram of electronic components of the electronic eyewear device.

FIG. 5 illustrates an example of capturing visible light with cameras 114A-B. Visible light is captured by the left visible light camera 114A with a round field of view (FOV). 111A. A chosen rectangular left raw image 558A is used for image processing by image processor 612 (FIG. 6). Visible light is also captured by the right visible light camera 114B with a round FOV 111B. A rectangular right raw image 558B chosen by the image processor 612 is used for image processing by processor 612. Based on processing of the left raw image 558A and the right raw image 558B having an overlapping field of view 513, a three-dimensional image 515 of a three-dimensional scene, referred to hereafter as an immersive image, is generated by processor 612 and displayed by displays 180C and 180D and which is viewable by the user.

FIG. 6 illustrates a high-level functional block diagram including example electronic components disposed in electronic eyewear device 100 or 200. The illustrated electronic components include the processor 632, the memory 634, and the see-through image display 180C and 180D.

Memory 634 includes instructions for execution by processor 632 to implement the functionality of electronic eyewear devices 100 and 200, including instructions for processor 632 to control the image 515. Processor 632 receives power from battery 650 and executes the instructions stored in memory 634, or integrated with the processor 632 on-chip, to perform the functionality of electronic eyewear devices 100 and 200 and to communicate with external devices via wireless connections.

The electronic eyewear devices 100 and 200 may incorporate an eye movement tracker 645 (e.g., shown as infrared emitter 215 and infrared camera 220 in FIG. 2B) and may provide user interface adjustments via a mobile device 690 and a server system 698 connected via various networks. Mobile device 690 may be a smartphone, tablet, laptop computer, access point, or any other such device capable of connecting with the electronic eyewear devices 100 or 200 using both a low-power wireless connection 625 and a high-speed wireless connection 637. Mobile device 690 is further connected to server system 698 via a network 695. The network 695 may include any combination of wired and wireless connections.

Electronic eyewear devices 100 and 200 may include at least two visible light cameras 114A-B (one associated with the left lateral side 170A and one associated with the right lateral side 170B). Electronic eyewear devices 100 and 200 further include two see-through image displays 180C-D of the optical assembly 180A-B (one associated with the left lateral side 170A and one associated with the right lateral side 170B). Electronic eyewear devices 100 and 200 also include image display driver 642, image processor 612, low-power circuitry 620, and high-speed circuitry 630. The components shown in FIG. 6 for the electronic eyewear devices 100 and 200 are located on one or more circuit boards, for example, a PCB or flexible PCB 140, in the temples. Alternatively, or additionally, the depicted components can be located in the temples, frames, hinges, hinged arms, or bridge of the electronic eyewear devices 100 and 200. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 645 implements the user interface field of view adjustment instructions, including instructions to cause the electronic eyewear devices 100 or 200 to track, via the eye movement tracker 213, the eye movement of the eye of the user of the electronic eyewear devices 100 or 200. Other implemented instructions (functions) cause the electronic eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 642 to present the sequence of displayed images, including the initial displayed image with the initial field of view and the successive displayed image with the successive field of view.

As shown in FIG. 6, high-speed circuitry 630 includes high-speed processor 632, memory 634, and high-speed wireless circuitry 636. In the example, the image display driver 642 is coupled to the high-speed circuitry 630 and operated by the high-speed processor 632 in order to drive the left and right image displays 180C-D of the optical assembly 180A-B. High-speed processor 632 may be any processor capable of managing high-speed communications and operation of any general computing system needed for electronic eyewear device 100 or 200. High-speed processor 632 includes processing resources needed for managing high-speed data transfers on high-speed wireless connection 637 to a wireless local area network (WLAN) using high-speed wireless circuitry 636. In certain examples, the high-speed processor 632 executes an operating system such as a LINUX operating system or other such operating system of the electronic eyewear device 100 or 200 and the operating system is stored in memory 634 for execution. In addition to any other responsibilities, the high-speed processor 632 executing a software architecture for the electronic eyewear device 100 or 200 is used to manage data transfers with high-speed wireless circuitry 636. In certain examples, high-speed wireless circuitry 636 is configured to implement Institute of Electrical and Electronic Engineers (IEEE) 802.11 communication standards, also referred to herein as WI-FI®. In other examples, other high-speed communications standards may be implemented by high-speed wireless circuitry 636.

Low-power wireless circuitry 624 and the high-speed wireless circuitry 636 of the electronic eyewear devices 100 and 200 can include short range transceivers (BLU-ETOOTH®) and wireless wide, local, or wide area network transceivers (e.g., cellular or WI-FI®). Mobile device 690, including the transceivers communicating via the low-power wireless connection 625 and high-speed wireless connection 637, may be implemented using details of the architecture of the electronic eyewear device 100 and 200, as can other elements of network 695.

Memory 634 includes any storage device capable of storing various data and applications, including, among other things, color maps, camera data generated by the left and right visible light cameras 114A-B and the image processor 612, as well as images generated for display by the image display driver 642 on the see-through image displays 180C-D of the optical assembly 180A-B. While memory 634 is shown as integrated with high-speed circuitry 630, in other examples, memory 634 may be an independent standalone element of the electronic eyewear device 100 or 200. In certain such examples, electrical routing lines may provide a connection through a system on chip that includes the high-speed processor 632 from the image processor 612 or low-power processor 622 to the memory 634. In other examples, the high-speed processor 632 may manage addressing of memory 634 such that the low-power processor 622 will boot the high-speed processor 632 any time that a read or write operation involving memory 634 is needed.

Server system 698 may be one or more computing devices as part of a service or network computing system, for example, that includes a processor, a memory, and network communication interface to communicate over the network 695 with the mobile device 690 and electronic eyewear devices 100 and 200. Electronic eyewear devices 100 and 200 may be connected with a host computer. For example, the electronic eyewear devices 100 or 200 may be paired with the mobile device 690 via the high-speed wireless connection 637 or connected to the server system 698 via the network 695.

Output components of the electronic eyewear devices 100 and 200 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 642. The output components of the electronic eyewear devices 100 and 200 further include acoustic components (e.g., speakers), haptic components (e.g., a vibratory motor), other signal generators, and so forth. The input components of the electronic eyewear devices 100 and 200, the mobile device 690, and server system 698, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone 130), and the like. The microphone 130 may provide voice inputs from the user to the voice command intent handler software 820 for processing by the high-speed circuitry 630, as will be described further below with respect to FIG. 8.

Electronic eyewear devices 100 and 200 may optionally include additional peripheral device elements such as ambient light and spectral sensors, biometric sensors, heat sensor 640, or other display elements integrated with electronic eyewear device 100 or 200. For example, the peripheral device elements may include any I/O components including output components, motion components, position components, or any other such elements described herein. The electronic eyewear devices 100 and 200 can take other forms and may incorporate other types of frameworks, for example, a headgear, a headset, or a helmet.

For example, the biometric components of the electronic eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 625 and 637 from the mobile device 690 via the low-power wireless circuitry 624 or high-speed wireless circuitry 636.

Voice-Controlled Settings and Navigation

In sample configurations, the user may propose augmented reality (AR) device settings adjustments and preview the adjustments on-the-go, in any context, without the need to access a paired device. The sample configurations may build upon the infrastructure for supporting voice scans such as "Hey Snapchat, show me some cool space lenses" of the type described in co-pending U.S. Provisional Patent Application Ser. No. 63/190,613 filed May 19, 2021, the contents of which are incorporated herein by reference. Implementation of the sample configurations described herein may be used to support almost arbitrary voice and navigation commands such as "set brightness to 10%," "what's my battery level," or "go to gallery" by decoupling the voice feature from the scan feature and adding a general-purpose voice command handler that expands voice capabilities of the electronic eyewear device 100 or 200. Also, all system settings may be centralized in one place to simplify changes in system settings using simple voice commands.

In conventional portable electronic devices such as electronic eyewear devices 100 and 200, it is common to require a user to navigate to a system information section in order to view most settings. Requiring such navigation is not very convenient for a quick battery or temperature level check while using an augmented reality device. In addition, changing settings may require access to a paired device, which should not be necessary for simple brightness adjustments.

The configurations described herein enable settings to be read and changed using voice commands and provide an infrastructure for handling and processing arbitrary voice commands from all contexts and flows of electronic eyewear devices 100 and 200. In sample configurations, the results are communicated without disrupting the current operations of the electronic eyewear devices 100 and 200. In the sample infrastructure, the voice processing is not bound to any particular feature or component.

The configurations described herein expand the use of a wake word beyond voice scan and provide infrastructure for general purpose voice commands (not just for settings). For example, the voice commands may include commands/actions such as:
 . . . volume/brightness up [+10]
 . . . volume/brightness down [-10]
 . . . current brightness/volume
 . . . set brightness/volume to n %
 . . . brightness auto
 . . . battery level
 . . . temperature The infrastructure may support virtually any well-defined voice command, and the results may be communicated as a notification/alert using the infrastructure. In sample configurations, the notifications/alerts infrastructure presents the results asynchronously, without disrupting user flow. As a result, the notifications/alerts infrastructure may be triggered from virtually any place in the user flow, which makes voice commands universally accessible. The voice command user interface may include conventional features for modifying settings but may also include additional actions that are available only via voice, like battery level and temperature.

Figure 7:
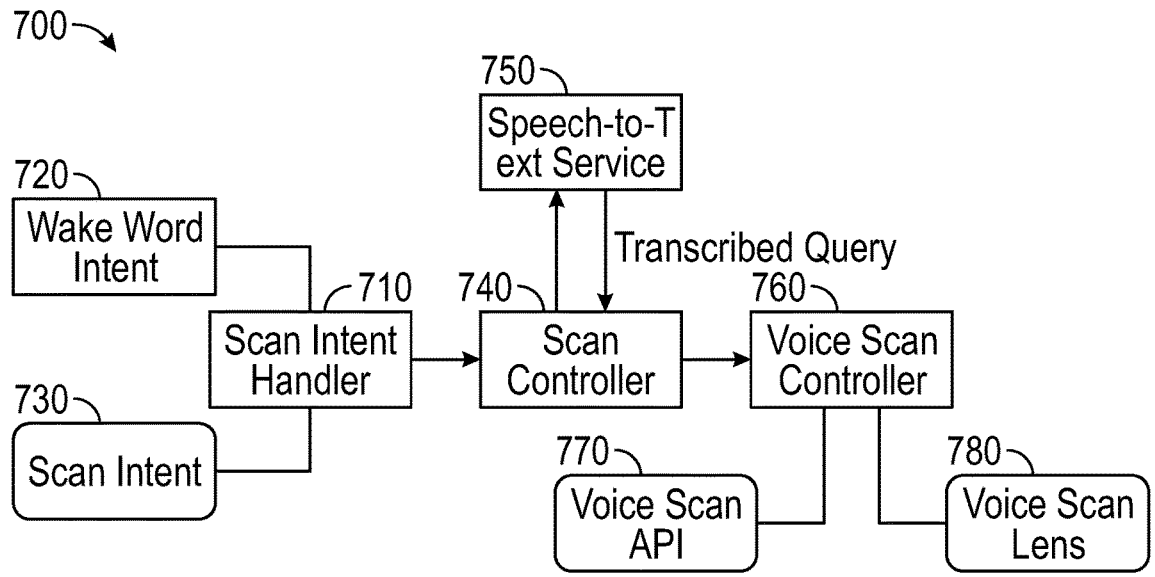
FIG. 7 illustrates a voice scan architecture where a scan intent handler determines the user's intent based on at least one of a wake word or eye scan intent data.

FIG. 7 illustrates a voice scan architecture 700 of the type described in co-pending U.S. Provisional Patent Application Ser. No. 63/190,613 filed May 19, 2021, where a scan intent handler 710 determines the user's intent based on at least one of a wake word provided at 720 or eye scan intent data provided at 730. A scan controller 740 may provide any received user audio data to speech-to-text service software 750 to transcribe the user's voice query following the wake word. The voice-to-text service software 750 may be provided on the electronic eyewear device 100 or 200 or may be provided in backend services available on the backend server system 698 accessible to the electronic eyewear device 100 or 200 to transcribe the user's spoken words. The identified spoken words may be used as tags (keywords) for lenses or other augmented reality objects to be provided to the display of the electronic eyewear device 100 in response to the captured voice data or, as described herein, the spoken words may include action keywords that may be used to select settings adjustments, navigation, scan, or other actions to be performed by the electronic eyewear device 100 or 200. The transcribed voice query is provided to a voice scan controller 760 to determine the user's query. In sample configurations, the user's query may be assumed to be a scan request to view a particular lens available through a voice scan application programming interface 770 or from a voice scan lens storage component 780.

Figure 8:
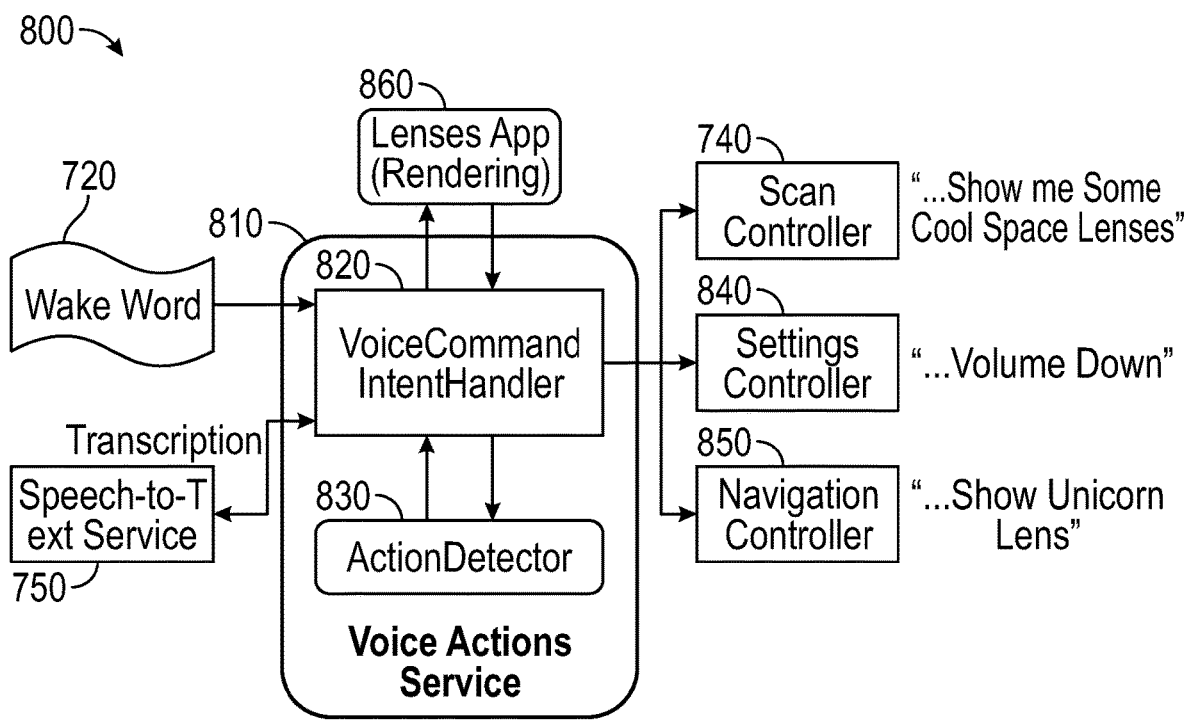
FIG. 8 illustrates a generalized voice command system including a voice actions service having a voice command intent handler that performs the initial interpretation of the voice command and routes it to the appropriate controller depending on its nature.

FIG. 8 illustrates a generalized voice command system 800 that modifies the voice scan architecture 700 of FIG. 7 to include a voice actions service 810 including a voice command intent handler 820 that performs the initial interpretation of the voice command and routes it to the appropriate controller depending on its nature. In sample configurations, the voice command intent handler 820 may be implemented in software on the electronic eyewear device 100 or 200 as illustrated in FIG. 6. In the illustrated configuration, a wake word 720 is received by the voice command intent handler 820 to begin the process of determining the user's intent for the following voice command. Upon receipt of the wake word (e.g., "Hey Snapchat," "Hey Siri," "Alexa," etc.), the voice command intent handler 820 provides the received voice data to the speech-to-text service 750. The recognized text is provided to action detector 830 and the recognized text is compared to a set of action keywords identifying the type of action being requested by the user. For example, the action detector 830 may match the recognized text against several regular expressions that are linked to certain commands/actions such as:
 "Set . . . "
 "Reduce . . . "
 "Increase . . . "
 "Volume . . . "
 "Brightness . . . "
 "Go to . . . "
 "Open . . . "
 etc.

If the recognized phrase is classified as a setting action (e.g., "set," "reduce," "increase," "volume," "brightness," etc.), the recognized phrase will be forwarded by the voice command intent handler to the settings controller 840 to adjust a setting based on other keywords in the recognized text. For example, the settings controller 840 may adjust a volume setting, a brightness setting, and the like. On the other hand, if the recognized phrase is classified as a navigation action (e.g., "go to" or "open"), the recognized phrase will be forwarded to the navigation controller 850 to navigate based on other keywords in the recognized text. Otherwise, the recognized phrase is provided to the scan controller 740 as in the configuration of FIG. 7 to be handled as a scan query. For example, if the user provided the text "Hey Snapchat, please set the brightness to 100 percent," the voice command intent handler 820 would recognize the text as a settings action based on the word "set" and provide at least the recognized keywords to the settings controller 840 to set the brightness to 100 percent. Similarly, the request may specify that the brightness be set to a value between 0-9 and the like. More generally, the recognized phrase or keywords in the recognized text may be provided to one of a plurality of controllers, where each of the plurality of controllers is associated with a different action keyword or set of action keywords to implement a command/action requested by the action keyword or set of action keywords. Also, as illustrated in FIG. 8, the presentation of the results of a requested action may be provided to the rendered display at 860 without disrupting the current action (e.g., rendering of a lens by a lens app).

It will be appreciated that the functionality shown in FIG. 8 may be implemented on the electronic eyewear device 100 or 200 described above and that the results of the actions may be presented to the image display 180C-D of the optical assembly of the electronic eyewear device 100 or 200. However, in other configurations, the pattern matching performed by the voice actions service 810 may be replaced with a natural language understanding (NLU) model that may be implemented on the electronic eyewear device 100 or 200 or provided on a backend server system 698 or mobile device 690 accessed via the high-speed wireless connection 637.

Figure 9:
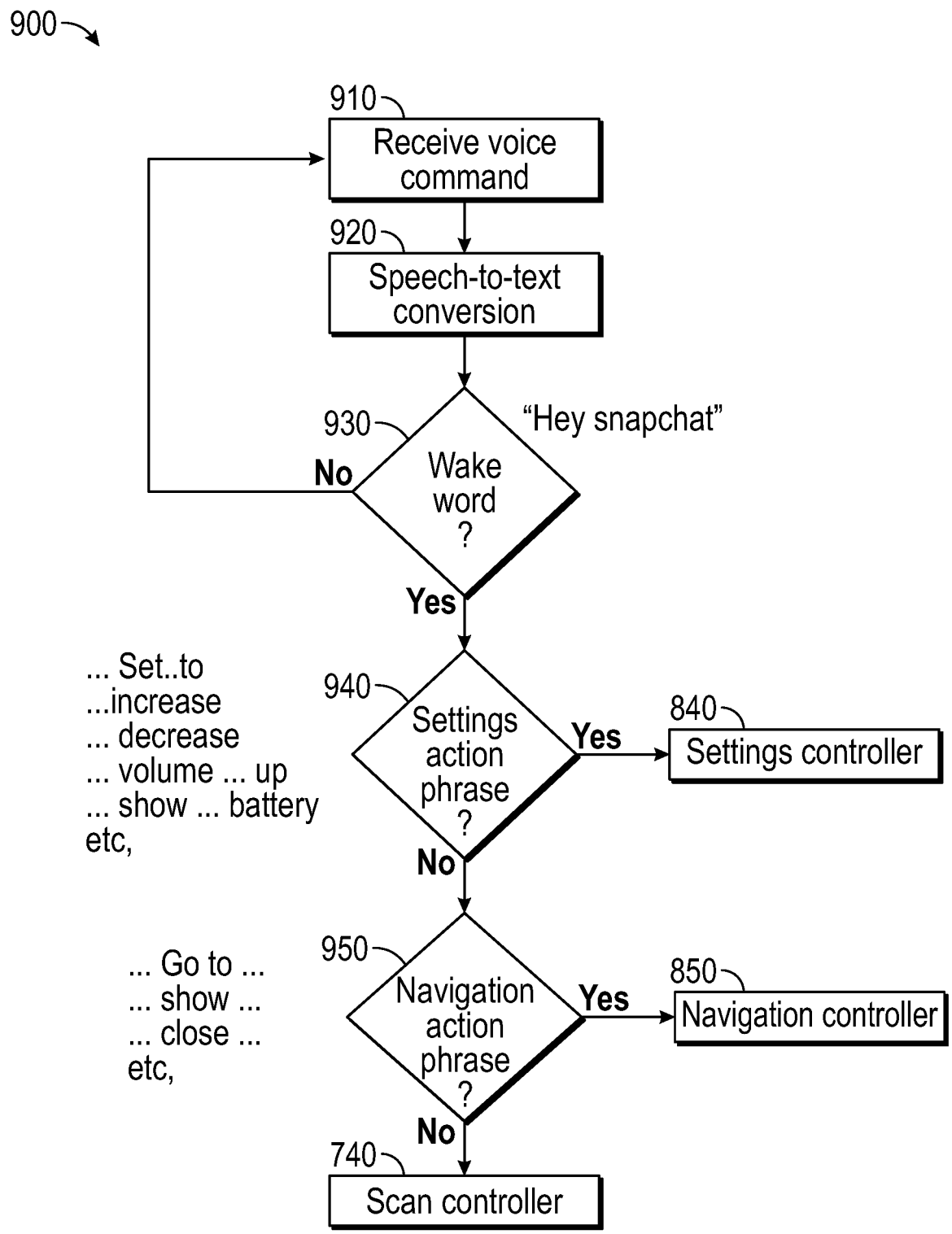
FIG. 9 illustrates a sample flow chart of the dispatch function of the voice actions service in a sample configuration.

FIG. 9 illustrates a sample flow chart 900 of the dispatch function of the voice actions service 810. As illustrated, voice data from the user is received from the microphone 130 at 910 and converted to text at 920. If a wake word (e.g., "Hey Snapchat") is not recognized in the processed text at 930, the voice actions service 810 awaits further input at 910. However, if the wake word is recognized at 930, the action detector 830 searches for a settings action phrase (e.g., " . . . set . . . to . . . ") at 940. When a settings action phrase is detected at 940, the recognized text is provided to the settings controller 840 to adjust the settings as requested. If no settings action phrase is detected at 940, the action detector 830 searches for a navigation action phrase (e.g., " . . . go . . . to . . . ") at 950. When a navigation action phrase is detected at 950, the recognized text is provided to the navigation controller 850 to navigate as requested. When no navigation phrase is detected at 950, it is assumed that the recognized phrase is to be provided to the scan controller 740. It will be appreciated that these steps may be performed in any order and that additional types of action phrases may be detected for finer parsing of the received voice commands. Also, it will be appreciated that the system need only detect certain action words and keywords in the text and may ignore other words. Also, as noted above, more sophisticated machine learning or natural language understanding (NLU) techniques may be implemented on the electronic eyewear device 100 or 200 or on backend server system 698 for more nuanced discrimination of the voice text.

FIGS. 10A-10D illustrate sample user interfaces for what would be presented to each eye in a sample configuration.

Figure 10A:
FIGS. 10A-10D illustrate sample user interfaces for what would be presented to each eye in a sample configuration.

FIG. 10A illustrates the user interface 1000 before an application has been selected. The user is encouraged to provide a voice command and a sample command may be suggested. A microphone may be displayed to show that the device is listening and the user's words optionally may be displayed as the words are recognized. The voice-to-text may be aligned at the bottom of the display and presented to the user as the text is recognized. The text also may be italicized to differentiate from any text presented by the app. The voice-to-text may fill from right to left and, if there is a lot of text, the text may appear to move up. The microphone and text may be presented as overlays on the user interface or as animations.

Figure 10B:
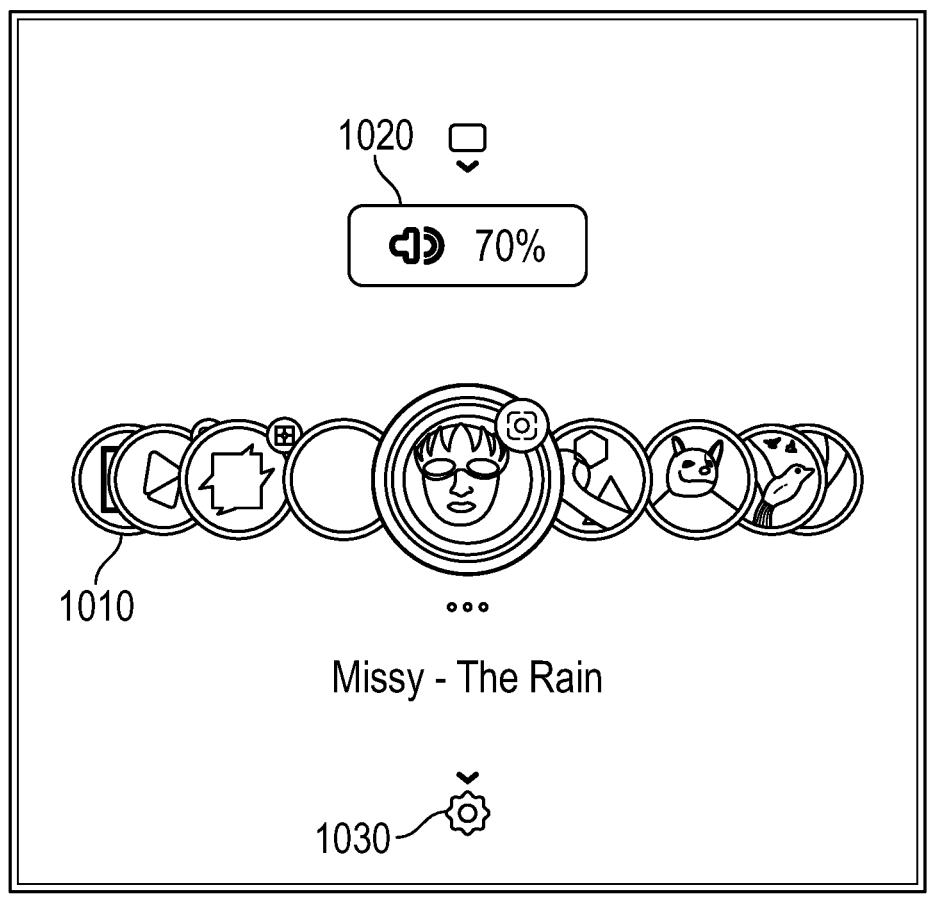

In FIG. 10B, the user has selected a lens application that is presented on the user interface as a lens carousel at 1010. In FIG. 10B, the user has also asked to see the volume level, which is shown as 70% at 1020. A settings icon 1030 may also be presented to show that the voice command/action has been recognized as a settings action. The settings icon 1030 and the volume data 1020 may be presented as an overlay on the user interface or may be shown as words (e.g., "volume") or data incorporated into the display without disrupting the flow of the user's interaction with the lens carousel 1010 or any other aspect of the display by the lens application.

Figure 10C:
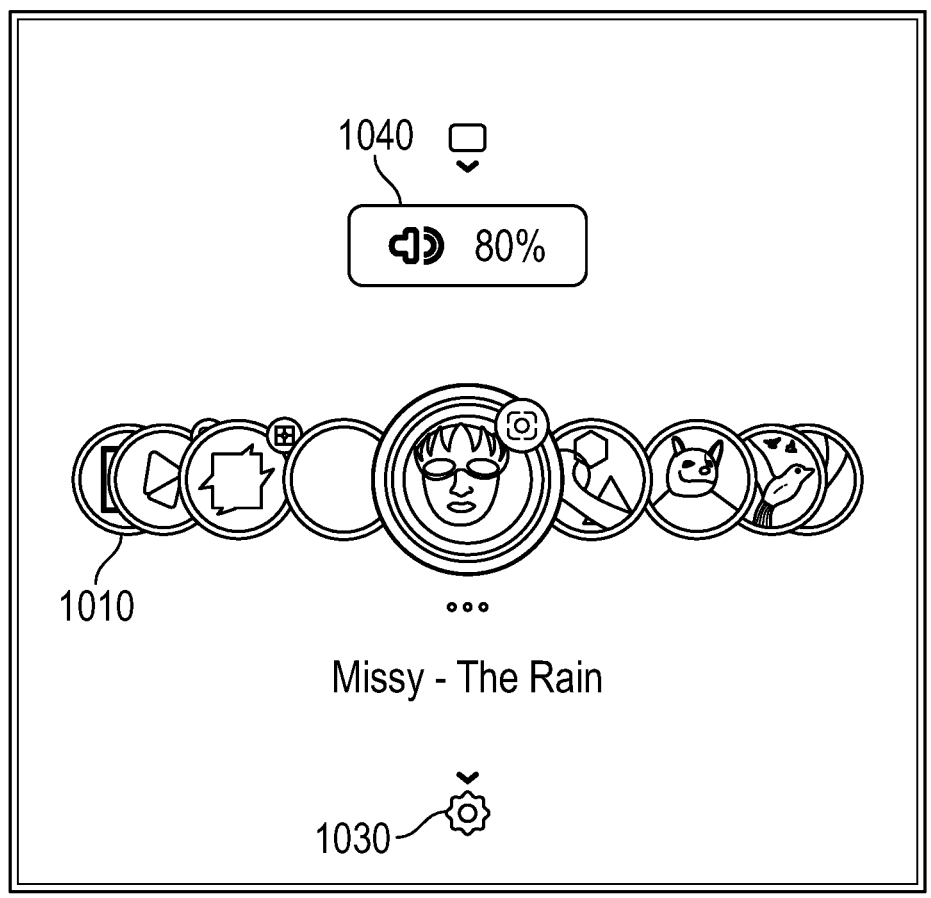

In FIG. 10C, the user has asked to increase the volume by 10%, and the volume level is updated to 80% at 1040. The display may also indicate that the volume has been increased by 10%.

Figure 10D:
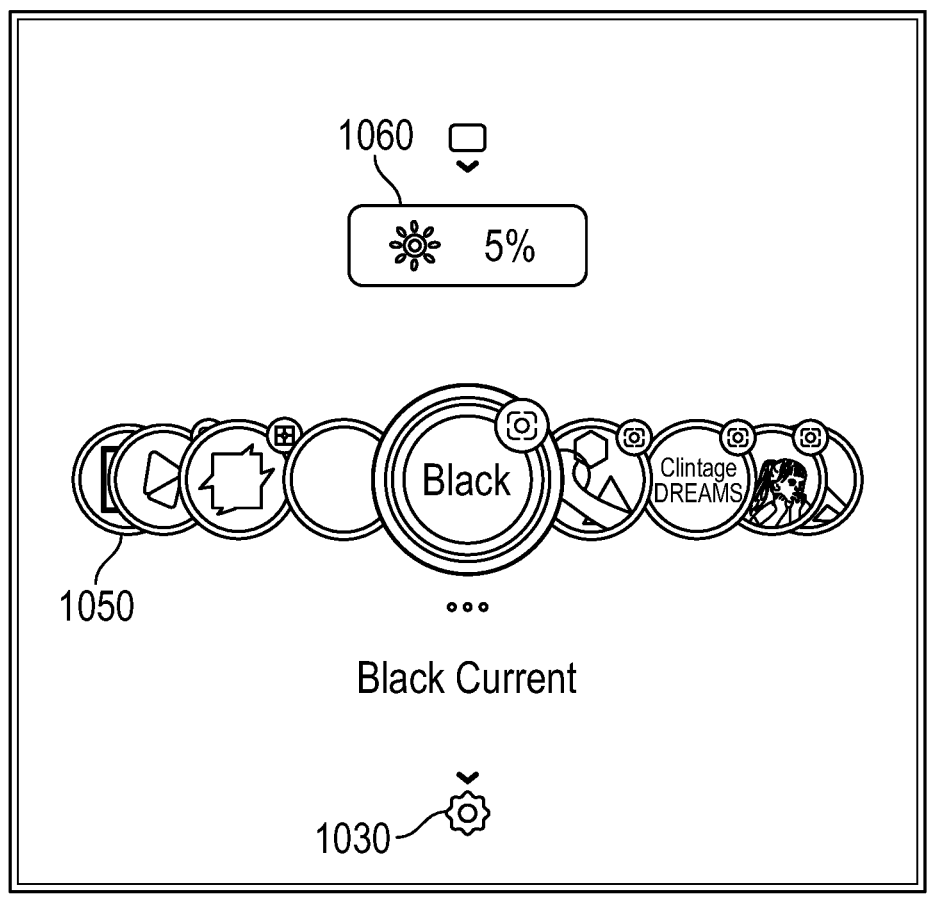

In FIG. 10D, a new lens application is presented as a lens carousel on the user interface at 1050. In FIG. 10D, the user has asked to see the brightness level, which is shown at 1060 to be 5%. As in FIG. 10B, the settings icon 1030 and the brightness data 1060 may be presented as an overlay on the user interface or may be shown as words (e.g., "brightness") or data incorporated into the display without disrupting the flow of the user's interaction with the lens carousel 1050 or any other aspect of the display by the lens application.

It will be appreciated that the settings and navigation information is desirably presented on the user interface in a manner that does not interfere with the underlying application (e.g., lens application). It will be further appreciated that the settings and navigation information may be presented as numbers, words, icons, animations, or a combination thereof.

Those skilled in the art will further appreciate that latency may be further reduced by starting the requested settings adjustments and navigation without waiting for the full sentence to be completed by the user. The key words may be recognized as they are spoken and the appropriate actions taken. Also, the commands/actions may be predicted based on the user's patterns of usage whereby the commands/actions may be recognized even before they are completed by the user. The corresponding notification may be presented to the user so that the user can verify whether the correct command/action has been applied. For example, the display in FIG. 10C could be modified to say "volume increased 10%" to provide feedback to the user. This way, the volume could be adjusted right away and further adjusted by the user if the notification does not reflect the user's intent. Other such modifications will become apparent to those skilled in the art.

Centralizing Settings Management

In the case of portable electronic devices such as electronic eyewear devices, the various settings may be scattered across the codebase. For example, some of the settings may be stored in the SystemInfoService, while others, like Volume and Brightness, may be handled in a connector service. These services may require connection to an app on a paired mobile device and may only be modified after pairing with the mobile device and adjusting the values with the paired app over a wireless connection. In order to avoid duplication of settings or dependence upon apps and services that increase latency and complexity, it is desirable to centralize settings management into a single place. The dispatch service described above enables all device settings to be grouped together on the portable electronic device for access by the settings controller in response to voice commands. Such device settings may include not just the settings that are controlled using remote procedure calls. Since the device settings may all be accessed on the portable electronic device, latency may be reduced. Also, since the device settings all may be provided on the portable electronic device, they may be accessed by a swipe, a voice command, a gesture, or another selection action.

System Configuration

Techniques described herein may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 11:
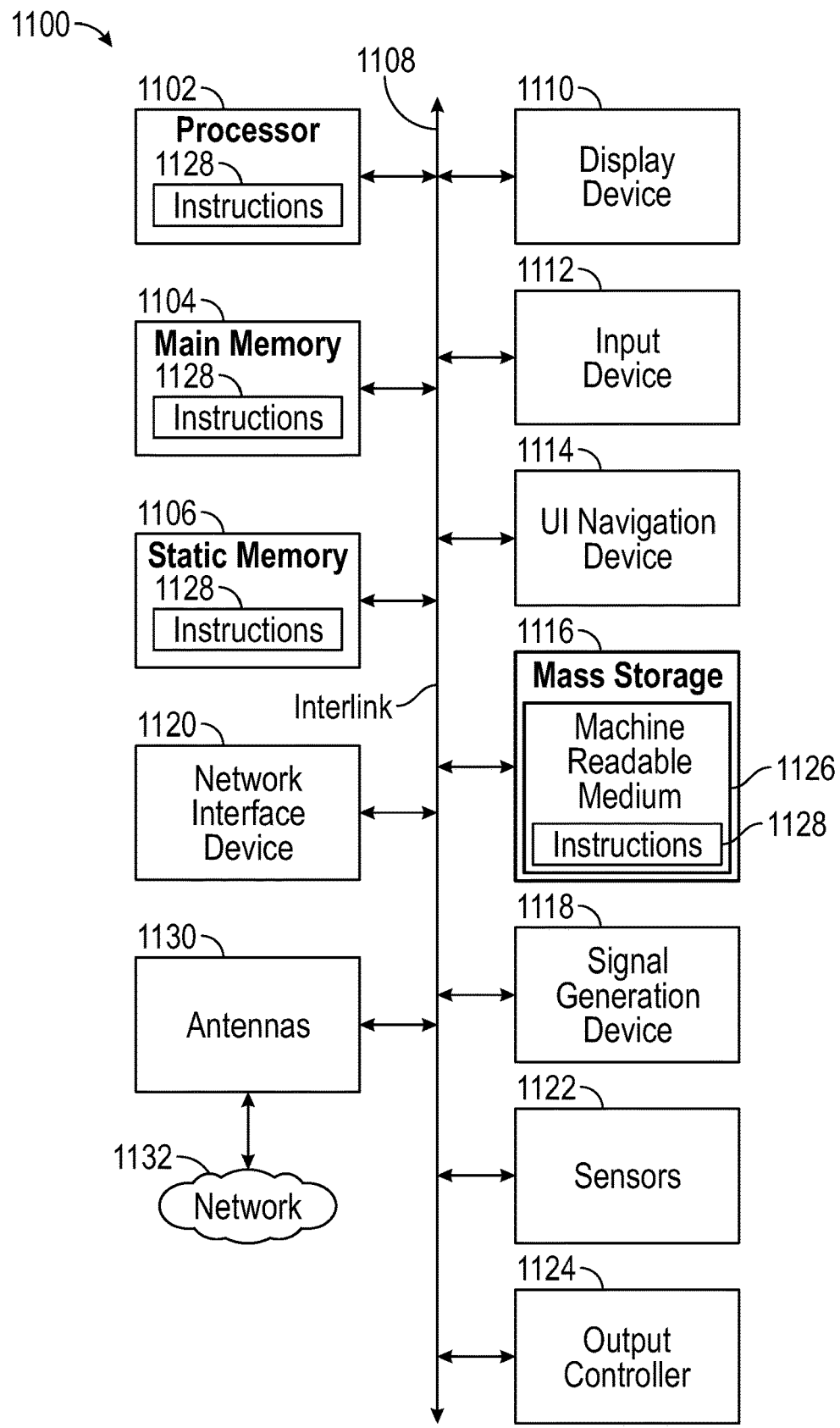
FIG. 11 illustrates a sample configuration of a computer system adapted to implement at least one of the server and the device hub in accordance with the systems and methods described herein.

By way of example, FIG. 11 illustrates a sample configuration of a computer system 1100 adapted to implement the backend services (e.g., voice-to-text or image processing services) in accordance with the systems and methods described herein. In particular, FIG. 11 illustrates a block diagram of an example of a machine 1100 upon which one or more configurations may be implemented. In alternative configurations, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. In sample configurations, the machine 1100 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1100 may serve as a workstation, a front-end server, or a back-end server of a communication system. Machine 1100 may implement the methods described herein by running the software used to implement the bots generated as described herein. Further, while only a single machine 1100 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110 (shown as a video display), an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1122. Example sensors 1122 include one or more of a global positioning system (GPS) sensor, compass, accelerometer, temperature, light, camera, video camera, sensors of physical states or positions, pressure sensors, fingerprint sensors, retina scanners, or other sensors. The machine 1100 may include an output controller 1124, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1116 may include a machine readable medium 1126 on which is stored one or more sets of data structures or instructions 1128 (e.g., software) embodying or utilized by any one or more of the techniques or functions described herein. The instructions 1128 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the mass storage device 1116 may constitute machine readable media.

While the machine readable medium 1126 is illustrated as a single medium, the term "machine readable medium" may include a single medium or multiple media (e.g., at least one of a centralized or distributed database, or associated caches and servers) configured to store the one or more instructions 1128. The term "machine readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1128 may further be transmitted or received over communications network 1132 using a transmission medium via the network interface device 1120. The machine 1100 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas 1130 to connect to the communications network 1132. In an example, the network interface device 1120 may include a plurality of antennas 1130 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

The features and flow charts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 720 or host computer of the service provider into the computer platforms of the client devices 810. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device adapted to be worn on a head of a user, comprising:
   a microphone;
   a memory that stores instructions;
   a scan controller; and
   a processor that executes the instructions to perform operations including:
   receiving audio data from the microphone;
   processing the audio data to identify a wake word;
   processing the audio data to identify at least one action keyword in the audio data;
   upon identification of the wake word, providing the audio data to one of a plurality of controllers, where each of the plurality of controllers is associated with a different action keyword or set of action keywords to implement an action in response to the different action keyword or set of action keywords; and
   when the audio data does not contain an action keyword indicative of a request to adjust a setting of the electronic eyewear device or of a request to navigate to system information of the electronic eyewear device, providing the audio data to the scan controller.

2. The electronic eyewear device of claim 1, further comprising speech-to-text software that is executed by the processor to convert the audio data to text, wherein the scan controller provides received audio data to the speech-to-text software to transcribe the audio data following the wake word.

3. The electronic eyewear device of claim 2, further comprising a display, wherein identified spoken words in the audio data are used as keywords for augmented reality objects to be provided to the display in response to the audio data.

4. The electronic eyewear device of claim 1, further comprising voice command intent handler software that is executed by the processor to identify action keywords in the audio data and to provide identified action keywords to an appropriate controller of the plurality of controllers based on which action keyword or set of action keywords are identified in the audio data.

5. The electronic eyewear device of claim 4, wherein the voice command intent handler software comprises a natural language understanding (NLU) model that transcribes the audio data following the wake word.

6. The electronic eyewear device of claim 1, further comprising a settings controller and a navigation controller, wherein the processor, upon identification of the wake word, provides the audio data to the settings controller to adjust settings of the electronic eyewear device as specified by the audio data when the at least one action keyword is indicative of a request to adjust a setting of the electronic eyewear device or to the navigation controller to navigate to system information of the electronic eyewear device as specified by the audio data when the at least one action keyword is indicative of a request to navigate to the system information of the electronic eyewear device.

7. The electronic eyewear device of claim 1, further comprising a display, wherein the processor executes the instructions to perform additional operations including presenting results of an action requested by the action keyword or set of action keywords to the display without disrupting a current action being presented to the display as part of execution of a software application.

8. The electronic eyewear device of claim 7, wherein the processor executes the instructions to perform additional operations including presenting a notification on the display indicating an action taken in response to the audio data received at the microphone.

9. A method of controlling an electronic eyewear device, comprising:
    receiving audio data from a microphone;
    processing the audio data to identify a wake word;
    processing the audio data to identify at least one action keyword in the audio data;
    upon identification of the wake word, providing the audio data to one of a plurality of controllers, where each of the plurality of controllers is associated with a different action keyword or set of action keywords to implement an action in response to the different action keyword or set of action keywords; and
    when the audio data does not contain an action keyword indicative of a request to adjust a setting of the electronic eyewear device or of a request to navigate to system information of the electronic eyewear device, providing the audio data to a scan controller.

10. The method of claim 9, further comprising providing, by the scan controller, received audio data to speech-to-text software to transcribe the audio data following the wake word to text.

11. The method of claim 10, further comprising using identified spoken words in the audio data as keywords for augmented reality objects and providing the augmented reality objects to a display in response to the audio data.

12. The method of claim 9, further comprising executing voice command intent handler software to identify action keywords in the audio data and providing identified action keywords to an appropriate controller of the plurality of controllers based on which action keyword or set of action keywords are identified in the audio data.

13. The method of claim 12, wherein executing the voice command intent handler software comprises implementing a natural language understanding (NLU) model that transcribes the audio data following the wake word.

14. The method of claim 9, further comprising, upon identification of the wake word, providing the audio data to a settings controller to adjust settings of the electronic eyewear device as specified by the audio data when the at least one action keyword is indicative of a request to adjust a setting of the electronic eyewear device or to a navigation controller to navigate to system information of the electronic eyewear device as specified by the audio data when the at least one action keyword is indicative of a request to navigate to the system information of the electronic eyewear device.

15. The method of claim 9, further comprising presenting results of an action requested by the action keyword or set of action keywords to a display without disrupting a current action being presented to the display as part of execution of a software application.

16. The method of claim 15, further comprising presenting a notification on the display indicating an action taken in response to the audio data received at the microphone.

17. A non-transitory computer-readable storage medium that stores instructions that when executed by at least one processor cause the at least one processor to control an electronic eyewear device by performing operations including:
    receiving audio data from a microphone;
    processing the audio data to identify a wake word;
    processing the audio data to identify at least one action keyword in the audio data;
    upon identification of the wake word, providing the audio data to one of a plurality of controllers, where each of the plurality of controllers is associated with a different action keyword or set of action keywords to implement an action in response to the different action keyword or set of action keywords; and
    when the audio data does not contain an action keyword indicative of a request to adjust a setting of the electronic eyewear device or of a request to navigate to system information of the electronic eyewear device, providing the audio data to a scan controller.

18. The medium of claim 17, further comprising instructions that when executed by the at least one processor cause the at least one processor to use identified spoken words in the audio data as keywords for augmented reality objects and to provide the augmented reality objects to a display in response to the audio data.

19. The medium of claim 17, further comprising instructions that when executed by the at least one processor cause the at least one processor to execute voice command intent handler software to identify action keywords in the audio data and to provide identified action keywords to an appropriate controller of the plurality of controllers based on which action keyword or set of action keywords are identified in the audio data.

20. The medium of claim 17, further comprising instructions that when executed by the at least one processor cause the at least one processor to, upon identification of the wake word, provide the audio data to a settings controller to adjust settings of the electronic eyewear device as specified by the audio data when the at least one action keyword is indicative of a request to adjust a setting of the electronic eyewear device or to a navigation controller to navigate to system information of the electronic eyewear device as specified by the audio data when the at least one action keyword is indicative of a request to navigate to the system information of the electronic eyewear device.

* * * * *